United States Patent

Nieman

Patent Number: 6,129,634
Date of Patent: Oct. 10, 2000

[54] THRUST WASHER FOR UNIVERSAL JOINT

[75] Inventor: Andrew L. Nieman, Lambertville, Mich.

[73] Assignee: Dana Corporation, Toledo, Ohio

[21] Appl. No.: 09/192,089

[22] Filed: Nov. 13, 1998

[51] Int. Cl.$^7$ .................................................. F16D 3/16
[52] U.S. Cl. ........................... 464/132; 464/14; 464/117; 464/905
[58] Field of Search ............................ 464/11, 14, 112, 464/117, 128, 130, 132, 136, 905

[56] References Cited

U.S. PATENT DOCUMENTS

| | | |
|---|---|---|
| 1,876,640 | 9/1932 | Dobson . |
| 1,931,649 | 10/1933 | Eger . |
| 3,635,535 | 1/1972 | Schultenkamper .......... 464/14 |
| 3,950,834 | 4/1976 | Pitner . |
| 4,130,325 | 12/1978 | Schultenkamper .......... 464/14 |
| 4,478,591 | 10/1984 | Mangiavacchi . |
| 4,650,440 | 3/1987 | Fisher ....................... 464/14 |
| 5,112,178 | 5/1992 | Overhues . |
| 5,542,753 | 8/1996 | Plumer . |
| 5,813,916 | 9/1998 | Lentini et al. ............... 464/14 |
| 5,865,678 | 2/1999 | Koedam et al. ............. 464/128 |

*Primary Examiner*—Lynne H. Browne
*Assistant Examiner*—Kenneth Thompson
*Attorney, Agent, or Firm*—MacMillan, Sobanski & Todd, LLC

[57] ABSTRACT

A universal joint assembly includes a cross having a plurality of trunnions extending outwardly therefrom. An internal passageway is formed in each of the trunnions that extends through to the outer end thereof. A bearing cup is disposed about each of the trunnions, and a plurality of needle bearings is disposed between each of the bearing cups and its associated trunnion to facilitate relative rotational movement. A thrust washer is disposed between the outer end surface of each of the trunnions and its associated bearing cup. Each of the trust washers is generally annular in shape, including an outer flat portion and an inner frusto-conical portion having a central opening formed therethrough. One or more grooves may be formed in one or both sides of the thrust washer. The frusto-conical portion of the thrust washer extends within the lubricant passageway to facilitate the installation thereof in a centered position on the outer end of the trunnion and subsequently maintain the thrust washer in that desired position during use.

18 Claims, 3 Drawing Sheets

THRUST WASHER FOR UNIVERSAL JOINT

BACKGROUND OF THE INVENTION

This invention relates in general to thrust washers that are disposed between the outer ends of trunnions and the inner surfaces of bearing cups in universal joint assemblies. More specifically, this invention relates to an improved structure for such a thrust washer that is formed having a protrusion that extends within a portion of a passageway formed in the outer end of the trunnion for positively positioning the thrust washer relative to the trunnion during use.

Universal joints are well known devices that provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly therefrom. The trunnions are oriented in a single plane and extend at right angles relative to one another. A hollow cylindrical bearing cup having a cylindrical outside wall and a circular end wall is mounted on the end of each of the trunnions. A plurality of bearings, such as needle bearings or roller bearings, are provided between the trunnion and the associated bearing cup to permit relative rotational movement therebetween. The bearing cups that are mounted on a first opposed pair of the trunnions can be connected to a first end yoke secured to an end of a first drive shaft section, while the bearing cups mounted on a second opposed pair of the trunnions can be connected to a second end yoke secured to an end of a second drive shaft section.

When the bearing cups are mounted on the opposed pair of trunnions, the end walls of the bearing cups are disposed adjacent to the axially outer ends of the trunnions and bearings. If the end walls of the bearing cups are fit tightly against the axially outer ends of the trunnions and bearings, friction between the surfaces during operation of the universal joint can generate heat and cause premature wear. If the bearing cups are fit loosely on the trunnions, the cross and trunnions can move back and forth within the opposed bearing cups during operation of the universal joint. This may create imbalance of the universal joint and generate undesirable noise and vibrations. To address these situations, it is known to position thrust washers between the end walls of the bearing cups and the axially outer ends of the trunnions and bearings. A typical thrust washer is formed from a wear-resistant material, such as plastic, that can absorb the thrust loads that occur between the ends of the trunnions and the bearing caps and take up any looseness therebetween.

To insure optimal function, it is desirable that the thrust washer be installed in a centered positioned relative to the outer end of the trunnion upon which it is located. Furthermore, it is desirable that such thrust washer be maintained in that centered position during subsequent use. Unfortunately, it has been found that the initial positioning of the thrust washer in a centered position on the outer end of the trunnion can add undesirable time and effort to the assembly process for the universal joint. Also, it is known that a conventional thrust washers can move laterally relative to the outer end of the trunnion upon which it is located during use. Thus, it would be desirable to provide an improved structure for a thrust washer that can facilitate the installation thereof in a centered position on the outer end of the trunnion and subsequently maintain the thrust washer in that desired position during use.

SUMMARY OF THE INVENTION

This invention relates to an improved structure for a thrust washer that can facilitate the installation thereof in a centered position on the outer end of the trunnion of a universal joint assembly and subsequently maintain the thrust washer in that desired position during use. The universal joint assembly includes a cross having a plurality of trunnions extending outwardly therefrom. An internal passageway is formed in each of the trunnions that extends through to the outer end thereof. A bearing cup is disposed about each of the trunnions, and a plurality of needle bearings is disposed between each of the bearing cups and its associated trunnion to facilitate relative rotational movement. A thrust washer is disposed between the outer end surface of each of the trunnions and its associated bearing cup. Each of the thrust washers is generally annular in shape, including an outer flat portion and an inner frusto-conical portion having a central opening formed therethrough. One or more grooves may be formed in one or both sides of the thrust washer. The frusto-conical portion of the thrust washer extends within the lubricant passageway to facilitate the installation thereof in a centered position on the outer end of the trunnion and subsequently maintain the thrust washer in that desired position during use.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
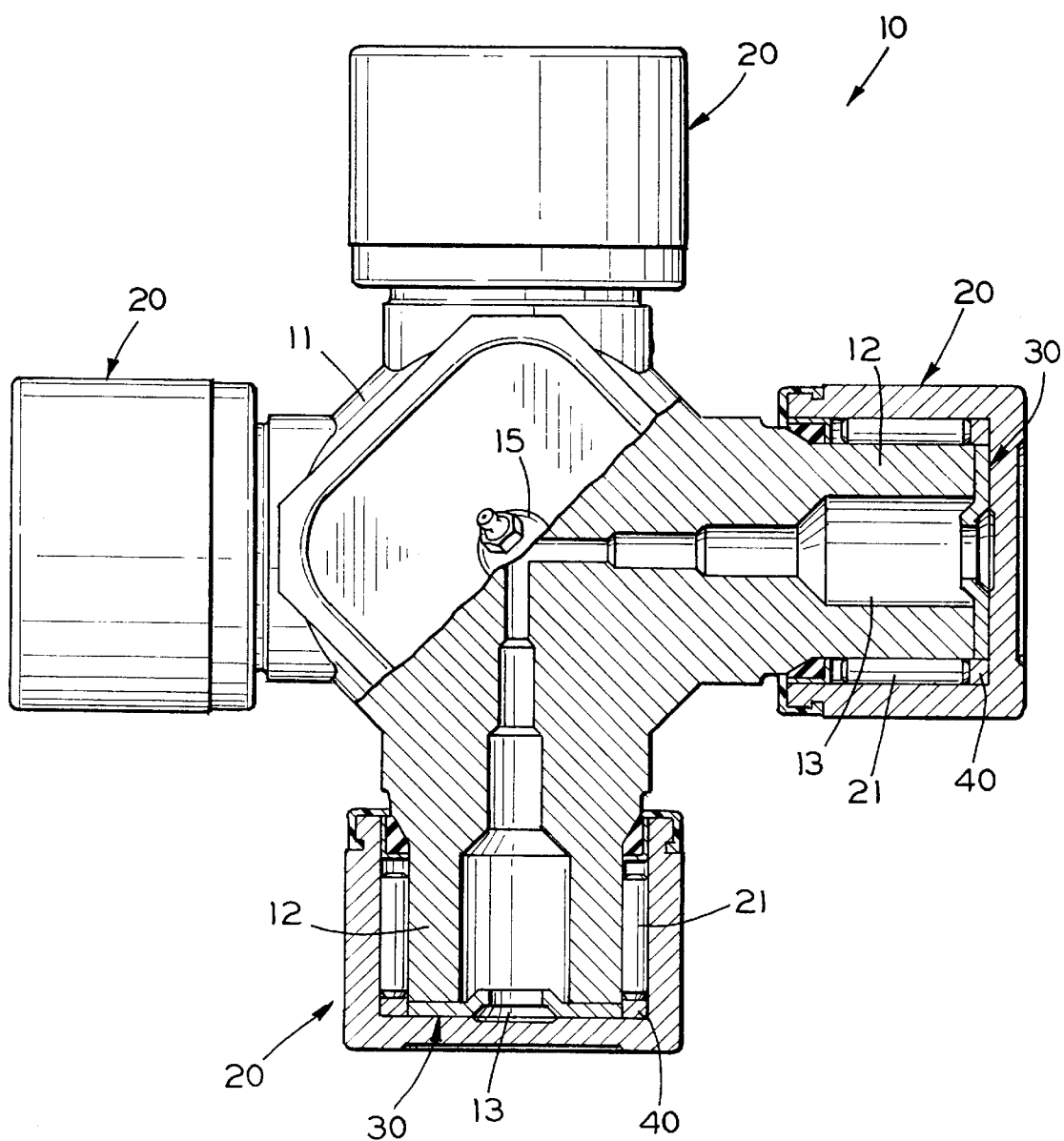
FIG. 1 is an elevational view, partially in cross section, of a cross for a universal joint assembly including a thrust washer in accordance with this invention.

Referring now to the drawings, there is illustrated in FIG. 1 a cross, indicated generally at 10, for a universal joint assembly in accordance with this invention. As is well known in the art, the cross 10 can form a portion of a universal joint assembly, together with a pair of yokes (not shown) or similar structures connected to respective torque transmitting shafts (not shown), both of which are conventional in the art. For example, each opposing pair of the trunnions 12 (i.e. trunnions that are located 180° apart from each other) can be retained within recesses or apertures formed in corresponding pairs of opposed arms of each of the yokes by any suitable fastening device (not shown). Suitable fastening devices include, but are not limited to, snap rings, injected molded plastic rings, U-bolts, or bolted plates that engage each bearing cup 20 and its associated yoke to fix each pair of opposing trunnions 12 in place within its associated yoke arms.

The illustrated cross 10 includes a central body portion 11 having a plurality of trunnions 12 extending outwardly therefrom. In the illustrated embodiment, four of such trunnions 12 are formed integrally with the body portion 11. The trunnions 12 are disposed at right angles relative to one another and are oriented so as to lie in a single plane. Each of the illustrated trunnions 12 is generally cylindrical in shape, having an outer end surface 12a and a cylindrical bearing surface 12b. However, the trunnions 12 may be formed having any desired shape or configuration and need not be formed integrally with the central body portion 11.

An internal passageway 13 is formed in each of the illustrated trunnions 12. Each of the internal passageways 13 extends outwardly from a central cavity (not shown) formed in the central body portion 11 of the cross member 10 through to the outer end surface 12b thereof. A fitting 15 may be provided in an aperture (not shown) formed in the central body portion 11 of the cross 10 to provide fluid communication with the central cavity (not shown) thereof. The fitting 15 can be used to supply lubricant through the central cavity and into the passageways 13 of the trunnions 12 for a purpose that will be explained below. The trunnions 12 may be formed having no such internal passageways 13 if desired.

A bearing cup, indicated generally at 20, is disposed about the end portion of each of the trunnions 12. Each of the bearing cups 20 includes an outer end portion 20a having a hollow cylindrical skirt portion 20b extending therefrom. When installed on the trunnion 12, the outer end portion 20a of the bearing cup 20 is disposed adjacent to the outer end surface 12a of the trunnion 12, while the hollow cylindrical skirt portion 20b of the bearing cup 20 is disposed about the cylindrical bearing surface 12b of the trunnion 12. A plurality of needle bearings 21 or other bearing structure is disposed between the inner surface of the hollow cylindrical skirt portion 20b of the bearing cup 20 and the cylindrical bearing surface 12b of the trunnion 12. Also, a conventional seal and dust guard assembly, indicated generally at 22, may (if desired) be provided about the open end of each bearing cup 20.

As mentioned above, the fitting 15 can be used to supply lubricant through the central cavity and into the passageways 13 of the trunnions 12. When so supplied, lubricant flows radially outwardly through each of the passageways 13, laterally between the outer end surfaces 12a of the trunnions 12 and the inner surfaces of the associated outer end portions 20a of the bearing cups 20, and radially inwardly into the regions of the needle bearings 21. As a result, lubricant can be supplied to the needle bearings 21 to facilitate rotational movement of the bearing cups 20 relative to the associated trunnions 12. Although the illustrated lubricant fitting 15 communicates with the central cavity of the central body portion 11 of the cross 10, the lubricant fitting 15 may be located at any desired location on the cross 10.

Figure 3:
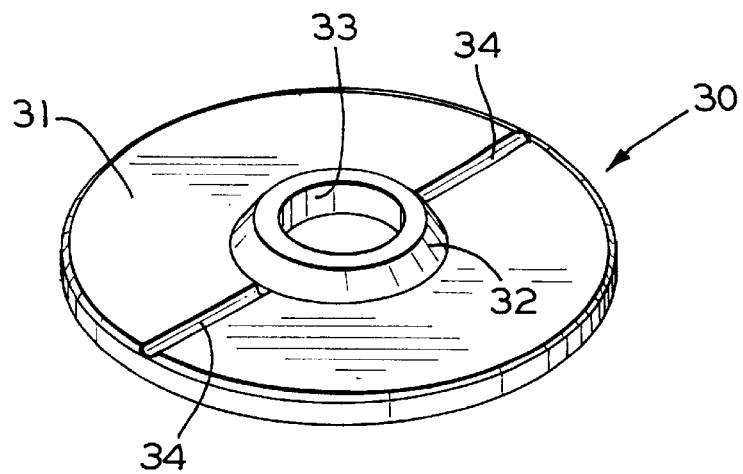
FIG. 3 is a perspective view of the thrust washer illustrated in FIGS. 1 and 2.
Figures 4, 5:
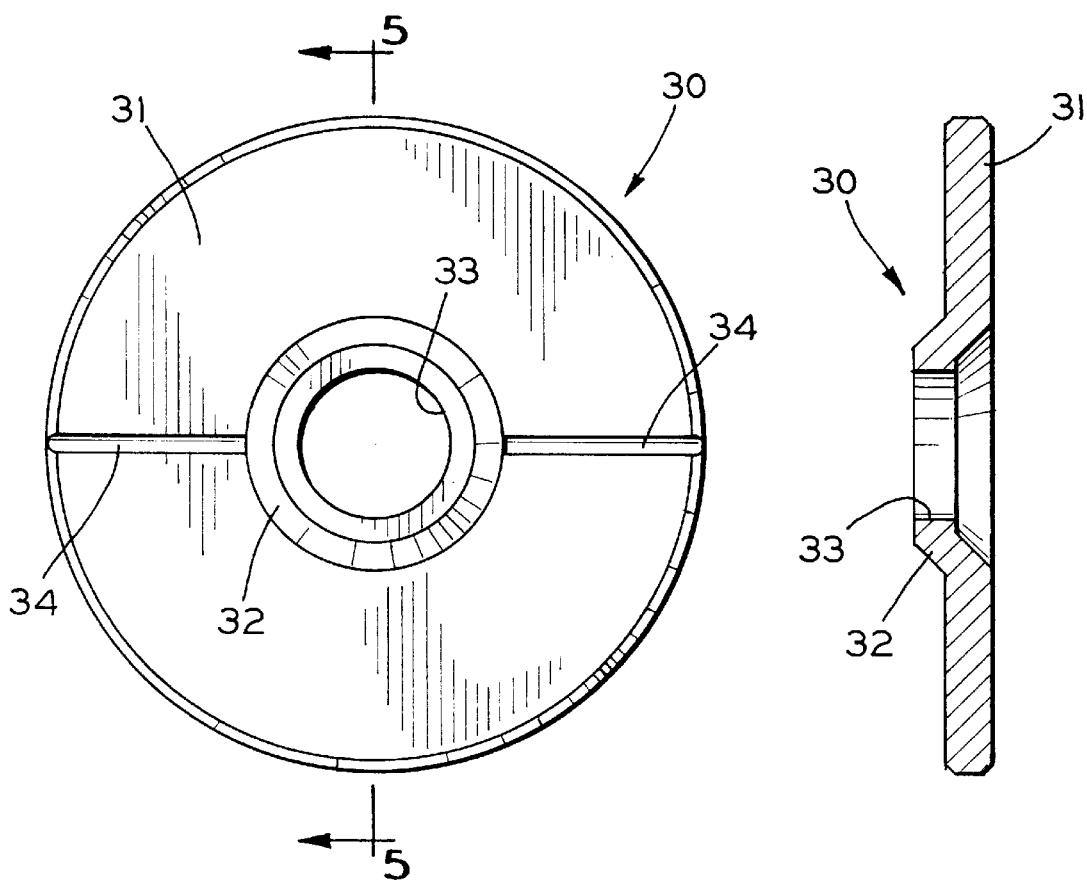
FIG. 4 is a top plan view of the thrust washer illustrated in FIG. 3.
FIG. 5 is a sectional elevational view of the thrust washer taken along line 5—5 of FIG. 4.

A thrust washer, indicated generally at 30, is disposed between the outer end surface 12 of at least one (and preferably all) of the trunnions 12 and the associated inner surfaces of the end portions 20a of the bearing cups 20. The structure of one of the thrust washers 30 is illustrated in detail in FIGS. 3 through 5. As shown therein, the thrust washer 30 is generally annular in shape, including a outer flat portion 31 and an inner frusto-conical portion 32. A central opening 33 is formed through the frusto-conical portion 32 of the thrust washer 30. One or more grooves 34 may be formed in one or both sides of the thrust washer 30. The grooves 34 may be provided to facilitate the flow of lubricant from the passageway 13 to the region of the needle bearings 21.

The thrust washer 30 may be formed from any desired or conventional material, but is preferably formed from a low friction material that can withstand any loading stresses that can occur during use. Also, it is preferred that the material be capable of being molded for ease of manufacturing. For example, the thrust washer may be formed from a resilient, deformable, elastic material such as plastic or rubber. Suitable materials include, but are not limited to plastics such as nylon or phenolics. For example, a nylon-based material, such as stanyl TW241F10 or nylatron GS51-13, or a glass filled nylon composite may be used.

If desired, an annular spacer 40 may be disposed about the outer surface of the thrust washer 30. The spacer 40 is conventional in the art and is provided to limit axial movement of the needle bearings 21 from the positions illustrated in the drawings. If desired, the inner circumferential surface of the spacer 40 may be sized to frictionally engage the outer circumferential surface of the thrust washer 30 to facilitate concurrent installation. Alternatively, the inner circumferential surface of the spacer 40 may be sized somewhat larger than the outer circumferential surface of the thrust washer 30 to permit a small amount of relative movement therebetween.

To assemble the universal joint assembly, the thrust washer 30 is initially disposed adjacent to the outer end surface 12a of the trunnion 12 such that at least a portion of the frusto-conical portion 32 extends within the lubricant passageway 13. As a result, the thrust washer 30 can be quickly and easily positioned in a desired centered location relative to the trunnion 12. Then, the bearing cup 20 containing the needle bearings 21 and the spacer 40 (if desired) is disposed about the trunnion 12 and the thrust washer 30. Because the frusto-conical portion 32 continues to extend within the lubricant passageway 13 after assembly, the thrust washer 30 will be positively maintained in the desired centered location relative to the trunnion 12 during use.

Figure 2:
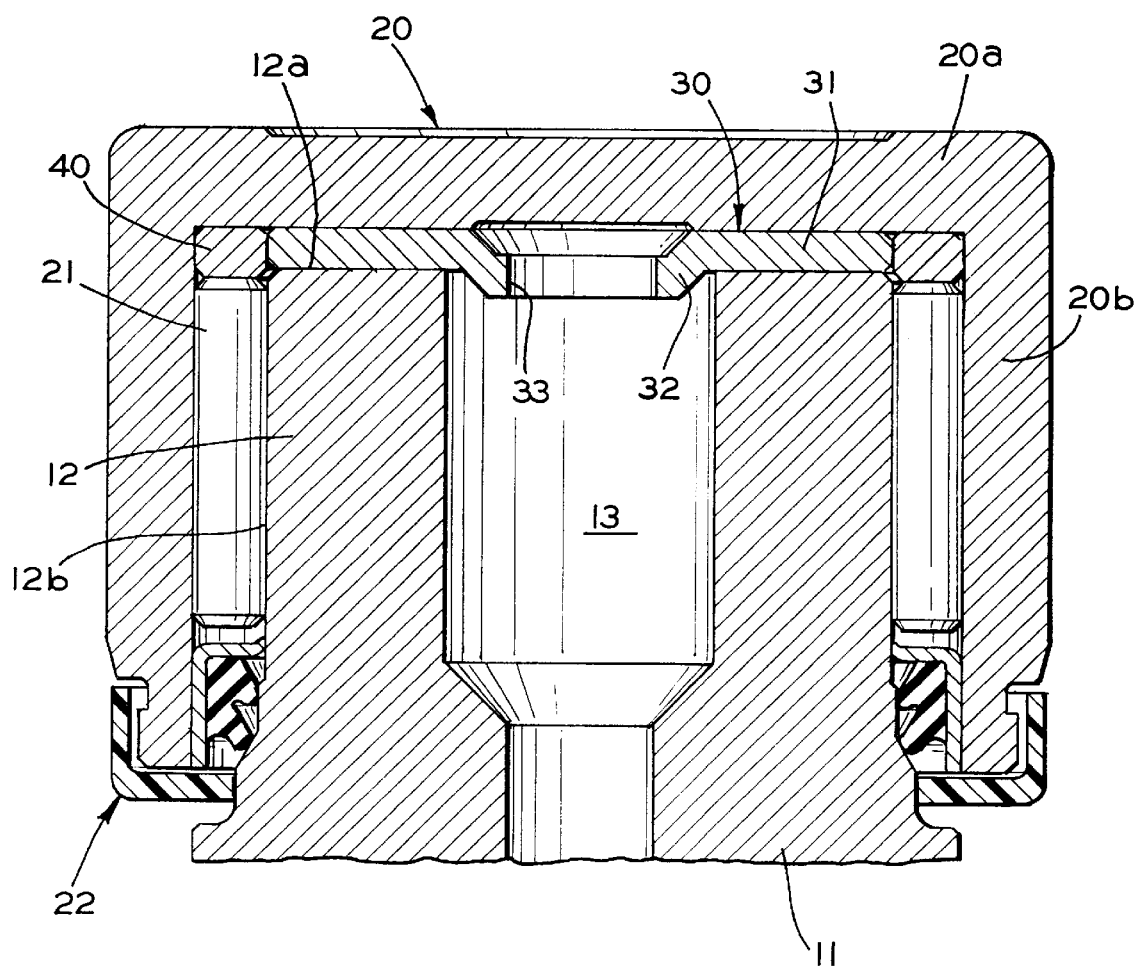
FIG. 2 is an enlarged sectional elevational view of a portion of one of the trunnions illustrated in FIG. 1, together with thrust washer of this invention and other associated components.

In the illustrated embodiment, the thickness of the thrust washer 30 is relatively constant throughout the outer flat portion 31 and the inner frusto-conical portion 32. However, it will be appreciated that the inner frusto-conical portion 32 may have a different thickness than the outer flat portion 31. For example, the outer surface of the thrust washer 30 (i.e., the surface adjacent to the inner surface of the outer end portion 20a of the bearing cup 20) may be formed flat throughout its entire extent, while the inner surface of the thrust washer 30 (i.e., the surface adjacent to the outer end surface 12a of the trunnion 12) may be tapered as shown. The frusto-conical portion 32 may be formed having a base diameter that is slightly smaller than the inner diameter of the lubricant passageway 13. Alternatively, however, the frusto-conical portion 32 may be formed having a base diameter that is approximately equal to, as shown in FIG. 2, or slightly larger than the inner diameter of the lubricant passageway 13 if desired.

As mentioned above, the trunnions 12 may be formed having no internal passageways 13 if desired. In this instance, the outer end surface 12a may be formed having a counterbore (not shown) or other recess into which the frusto-conical portion 32 of the thrust washer 30 may extend in the manner described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A cross for a universal joint comprising:
   a body having a trunnion extending outwardly therefrom, said trunnion including an end surface having a recess formed therein defining an inner surface;
   a bearing cup rotatably mounted on said trunnion; and
   a thrust washer disposed between said bearing cup and said end surface of said trunnion, said thrust washer including a portion that extends within said recess and engages said inner surface of said trunnion so as to positively position said thrust washer relative to said trunnion.

2. The cross for a universal joint defined in claim 1 wherein said recess is formed by a passageway formed through said trunnion.

3. The cross for a universal joint defined in claim 2 wherein said body has a cavity formed therein that communicates with said passageway.

4. The cross for a universal joint defined in claim 3 further including a fitting mounted on said body portion and communicating with said cavity.

5. The cross for a universal joint defined in claim 1 wherein said recess defines a diameter, and wherein said frusto-conical portion defines a diameter that is approximately the same as said recess diameter.

6. The cross for a universal joint defined in claim 1 wherein said recess defines a diameter, and wherein said frusto-conical portion defines a diameter that is larger than said recess diameter.

7. The cross for a universal joint defined in claim 1 wherein said frusto-conical portion has an aperture formed therethrough.

8. The cross for a universal joint defined in claim 1 further including a plurality of roller bearings disposed between said trunnion and said bearing cup.

9. The cross for a universal joint defined in claim 8 further including an annular spacer disposed between said bearing cup and said roller bearings, said annular spacer extending about said thrust washer.

10. The cross for a universal joint defined in claim 1 wherein said body has a plurality of trunnions extending outwardly therefrom, each of said trunnions including an end surface having a recess defining an inner surface formed therein, and wherein a bearing cup is rotatably mounted on each of said trunnions, and wherein a thrust washer is disposed between each of said bearing cups and said end surfaces of said trunnions, each of said thrust washers including a portion that extends within said recess and engages said inner surface of said trunnion so as to positively position said thrust washer relative to said trunnion.

11. The cross for a universal joint defined in claim 10 wherein each of said recesses is formed by a passageway formed through said trunnion.

12. The cross for a universal joint defined in claim 11 wherein said body has a cavity formed therein that communicates with each of said passageways.

13. The cross for a universal joint defined in claim 12 further including a fitting mounted on said body portion and communicating with said cavity.

14. The cross for a universal joint defined in claim 10 wherein each of said recesses defines a diameter, and wherein each of said frusto-conical portions defines a diameter that is approximately the same as said recess diameter.

15. The cross for a universal joint defined in claim 10 wherein each of said recesses defines a diameter, and wherein each of said frusto-conical portions defines a diameter that is larger than said recess diameter.

16. The cross for a universal joint defined in claim 10 wherein each of said frusto-conical portions has an aperture formed therethrough.

17. The cross for a universal joint defined in claim 10 further including a plurality of roller bearings disposed between each of said trunnions and said bearing cups.

18. The cross for a universal joint defined in claim 17 further including an annular spacer disposed between each of said bearing cups and said roller bearings, said annular spacers extending about said thrust washers.

* * * * *